3,759,863
PROCESS FOR THE MANUFACTURE OF IMPACT RESISTANT THERMOPLASTIC MOULDING MATERIALS

Arno Czekay, 13 Dr. Krauss-Strasse, Knapsack, near Cologne, Germany; Bruno Kramer, 79 Bergstrasse, Hurth, near Cologne, Germany; and Hans Weiden, 67 Friedenstrasse, Frechen, near Cologne, Germany
No Drawing. Filed Jan. 6, 1971, Ser. No. 104,507
Claims priority, application Germany, Jan. 7, 1970,
P 20 00 468.6
Int. Cl. C08f 45/28
U.S. Cl. 260—33.6 AQ                          6 Claims

ABSTRACT OF THE DISCLOSURE

Production of impact-resistant thermoplastic moulding compositions. Between 90 and 97 weight percent of a mixture of 40 to 95 weight percent polyvinyl chloride and 5 to 60 weight percent terpolymer based on acrylonitrile-butadiene-styrene and their derivatives, are intimately blended with 1 to 4 weight percent dialkyl-tin mercaptide stabiliser and 2 to 6 weight percent lubricant, which essentially contains hydrocarbons with at least 16 C atoms; and the resulting blend is made into a moulding composition. The terpolymer used is produced by polymerizing butadiene, in a first step, with a vinyl compound in aqueous emulsion, in contact with 0.1 to 1 weight percent customary catalyst and at most 0.2 weight percent emulsifier, based on the amount of diene and vinyl compounds used, at a temperature of between —20° C. and +100° C., to give an elastomeric copolymer; reacting the said copolymer, in a second step, with a vinyl monomer, such as styrene, α-methylstyrene or mixtures of these compounds with acrylonitrile or methacrylonitrile, in aqueous emulsion, to give a graft polymer; and blending the graft polymer in a third step with a copolymer based on the second step vinyl compounds to form the final copolymer.

---

The invention relates to a process for the manufacture of impact-resistant thermoplastic moulding compositions based on polyvinyl chloride, modified by the addition of a copolymer of acrylonitrile/butadiene/styrene or their derivatives, in the presence of certain stabilisers and lubricants.

Polybutadiene rubbers and polyvinyl chloride—hereafter referred to as PVC—are inherently incompatible polymers, which on processing by mixing to give a moulding composition do not lead to a firm bond between the elastomer and the PVC. Subjecting such a moulding composition to mechanical stresses shows that the properties of the rubber in the moulding composition are poorly utilised, in that the moulding composition shows a low impact strength. Furthermore, an inadequate bond between the abovementioned components leads to inhomogeneous regions in the moulding composition, which manifests itself in discolourations during processing, or in surface roughness and reduced surface gloss.

To avoid these disadvantages it has therefore been proposed to bring about better compatibility between PVC and the rubber component by grafting vinyl chloride onto the rubber. This grafting reaction however represents an additional process step within the framework of the manufacture of the impact-resistant moulding compositions in question, and depending on the proportion of the vinyl chloride in the moulding composition, a product is obtained which is distinguished either by good mechanical strength and inadequate surface gloss or by the converse properties, but never combines within itself an optimum of both properties.

It is known from the journal "Kunststoffe," vol. 56, 1966, issue 10, pages 703–704, to use copolymers of acrylonitrile/butadiene/styrene—hereafter referred to as ABS resins—as modifiers for impact-resistant PVC. If, for example, 10 to 15% by weight of the ABS resin are added to the PVC, the impact strength of the moulding composition formed from this resin mixture is significantly improved. Depending on the end use and the requirements in question, there are various grades with different contents of butadiene and acrylonitrile, including also grades which permit the manufacture of transparent films, sheets and hollow articles. According to the information in the abovementioned journal, an impact-resistant PVC modified with ABS copolymers can for example have the following composition:

|  | Parts by wt. |
| --- | --- |
| PVC | 90 |
| ABS | 10 |
| Organo-tin stabiliser | 2 |
| Calcium stearate | 1 |

A moulding composition manufactured from these components is supposed to display significantly better impact strength than ABS-free PVC moulding compositions, but a worsening of the modulus of elasticity and of the dimensional heat stability must be tolerated. Since the addition of ABS copolymers to the PVC affects the heat resistance of the PVC, it is advisable to stabilise the resin mixture with one of the customary heat stabilisers. It is furthermore known to improve the processability of such resin mixtures by introducing lubricants into the resin mixture, without the physical properties of the moulding compositions manufactured from the resin mixture being significantly influenced in a negative sense.

The present invention was based on the task of developing a process which permits the manufacture of impact-resistant, thermoplastic moulding compositions from polyvinyl chloride and a terpolymer of ABS or its derivatives, whereby it is intended not only to achieve an improvement in the impact strength, but also in the remaining physical properties of the moulding composition, such as surface gloss, limiting flexural stress, ball indentation hardness, dimensional heat resistance and the like.

It has now surprisingly been found that the abovementioned requirement can be fulfilled if, firstly, the PVC powder is intimately mixed with an ABS terpolymer which has been manufactured in a certain manner, and additionally a special heat stabiliser and a specific lubricant are added to the mixture.

The process according to the invention for the manufacture of impact-resistant moulding compositions by intimately mixing polyvinyl chloride with a terpolymer in the presence of a stabiliser and a lubricant, and further processing of the resulting mixture, in a known manner, with heating, to give a moulding composition, thus consisting of mixing 90 to 97% by weight of a mixture of 40 to 95% by weight of polyvinyl chloride and 5 to 60% by weight of a terpolymer from the components acrylonitrile-butadiene-styrene, as well as their derivatives, with 1 to 4% by weight of a dialkyl-tin mercaptide stabiliser and 2 to 6% by weight of a lubricant which essentially includes hydrocarbons with at least 16 C atoms, and processing the resulting mixture in a known manner to give a moulding composition, the terpolymer employed being obtained as follows: in a 1st process stage, butadiene is polymerised with about 1 to 30% by weight of a vinyl compound, such as acrylonitrile, acrylic acid alkyl esters with at most 4 carbon atoms in the alkyl radical or styrene or appropriate mixtures, in aqueouse emulsion, in the presence of 0.1 to 1% by weight of a customary catalyst and at most 0.2% by weight of an emulsifier, relative to the amount of diene and vinyl compound employed, at a temperature of between $-20°$ C. and $+100°$ C., to give an elastomeric copolymer; thereafter reacting the resulting copolymer, in a 2nd process stage, with vinyl monomers such as styrene, $\alpha$-methylstyrene or mixtures of these compounds with acrylonitrile or methacrylonitrile, at a temperature of a catalyst, to give a graft polymer; and in a 3rd process stage mixing the product with a copolymer of the vinyl compounds of the 2nd process stage which preferably has a K value of between about 46 to 63, to form the desired copolymer.

According to a preferred procedure, a mixture of 70 to 90% by weight of polyvinyl chloride and 10 to 30% by weight of the terpolymer is prepared, and the polyvinyl chloride should have a K-value of about 60 to 70.

Suitable stabilisers have proved to be dialkyl-tin mercaptides of the general formula

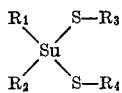

in which $R_1$ and $R_2$ each denote an alkyl radical with 4 to 10 C atoms and $R_3$ and $R_4$ each denote an alkyl radical with at most 24 C atoms or a $-CH_2-COOR_5$ radical, with $R_5$ representing an alkyl radical with up to 24 C atoms. In particular, di-(n-butyl)-tin bis-dodecylmercaptide or di-(n-octyl)-tin S,S-bis-(isoocytylmercaptoacetate) are suitable. As regards the use of lubricants, a mineral oil of hydrocarbons with 20 to 30 C atoms, having a boiling range of above 350° C. and a refractive index of $n_D^{20}=1.4816$ is to preferred.

The starting mixture according to the invention can be converted into a moulding composition according to known methods of processing, for example by milling, kneading, extrusion or the injection moulding process. As regards the manufacture of the terpolymer in the 3 process stages described, it should be noted that in the 1st process stage an inorganic or organic peroxide compound or appropriate mixtures are advantageously employed as the catalyst. It is however also possible to use hydrogen peroxide, azo compounds, or redox systems of a peroxide compound and a low-valency metal compound or sulphur compound as the reducing agent. Examples of suitable emulsifiers in the 1st process stage are the alkali salts of fatty acids with 8 to 20 carbon atoms, resins soaps, alkyl sulphates or alkyl sulphonates or alkylarylsulphonates with 8 to 20 carbon atoms in the alkyl radical.

To carry out the grafting reaction in the 2nd process stage of the manufacture of the terpolymer, it is advisable to graft the elastomeric copolymer of the 1st process stage with at most about 30% by weight of vinyl monomers, relative to the amount of graft polymer, with the term vinyl monomer for example encompassing a monomer mixture of styrene and acrylonitrile.

Finally, a preferred embodiment of the process of the invention consists of the mixture of elastomeric graft polymer and vinyl copolymer, manufactured in the 3rd process stage of the manufacture of the terpolymer, containing 5 to 50% by weight of the elastomer consistutent and 95 to 50% by weight of vinyl copolymer.

The moulding compositions obtained according to the process of the invention are distinguished by high stiffness and surface hardness, as shown by measurements of the limiting flexural stress and of the ball indentation hardness, and this is surprising in view of the simultaneous unusual toughness of the moulding compositions. Resin mixtures according to the invention can even by processed by the injection moulding process and show good flow and no discolouration of the moulding composition produced, the latter being opaque white and showing excellent surface gloss. The measurement of the surface gloss or the determination of the gloss index can be carried out according to the following method:

An injection moulded sheet is illuminated by a source of light at an angle of 45°. A photocell is located in the plane of reflection of the light, which converts the amount of light reflected by the sample surface into a pointer deflection of a milliammeter. The gloss index is read off directly. The ammeter is calibrated between 0 and 100 units by means of black velvet and a polished black glass respectively.

The improvement in quality achieved relative to comparable known moulding compositions in the moulding composition according to the invention was not to be expected and can only be attributed to (a) the use of a particularly suitable terpolymer of acrylonitrile/butadiene/styrene or their derivatives and (b) the use of a specific stabiliser and lubricant. As can be seen from the examples and tables which follow, the optimum properties of the PVC modified according to the invention are not achievable if only one of the three essential characteristics of the invention, consisting of the terpolymer described, the stabiliser and the lubricant, is modified.

The examples which follow demonstrate the procedure according to the invention and the advantages achieved thereby, by means of Examples 18 to 22, whilst the Comparison Examples 1 to 17 are intended to show the disadvantageous effect on the particular moulding compositions obtained through using a different terpolymer or stabilizer or lubricant than those according to the invention. Fundamentally, it can be deduced from Tables 1 and 2 that the moulding compositions manufactured according to the process of the invention show optimum mechanical properties throughout, whilst the moulding compositions manufactured for comparison are for example characterised by good dimensional heat stability, but on the other hand no not meet the requirements posed as regards notched impact strength, gloss index or colour (see Example 6).

EXAMPLE 1

(a) Manufacture of a copolymer of butadiene and acrylonitrile: A 16 litre autoclave with a stirrer was filled with 2880 g. of butadiene, 320 g. of acrylonitrile, 7040 g. of electrolyte water, 32 g. of sodium abietate as the emulsifier and 80 g. of an aqueous N/1 NaOH solution, and the air in the autoclave was displaced by flushing with nitrogen. The concentration of the emulsifier was 1% by weight, relative to the amount of butadiene and of acrylonitrile. After displacing the nitrogen in the autoclave by gaseous butadiene, the autoclave was closed and the contents were stirred for 30 minutes at a stirring speed of 200 revolutions per minute. The contents were then heated to 70° C. and after cutting back the stirring speed to 100 revolutions per minute, a solution prepared from 9.6 g. of potassium persulphate and 500 g. of water was added. The temperature in the interior of the autoclave was kept at 70° C. by external cooling. When the pressure in the autoclave had dropped from initially 8.5 atmospheres gauge to 2 atmospheres gauge, the pressure was released, and the resulting latex was flushed with nitrogen for 30 minutes. 9300 g. of final latex, of 29% by weight solids content, were obtained, whilst the conversion was 92% of theory.

(b) Grafting the butadiene/acrylonitrile copolymer with a monomer mixture of styrene and acrylonitrile: 3720 g. of the latex obtained according to 1a), 208 g.

of styrene, 62 g. of acrylonitrile and a solution of 105 g. of water and 20 mg. of potassium persulphate were introduced into a 10 litre glass flask equipped with a stirrer, thermometer and reflux condenser. The mixture was kept for 4 hours at a temperature of 80° C. with moderate stirring, and subsequently freed of excess styrene and acrylonitrile by passing in steam. 100 parts of the graft latex contained 26.6 parts by weight of graft polymer.

(c) Mixing the graft polymer with a copolymer of styrene and acrylonitrile: The graft of polymer latex obtained according to 1(b) was mixed with an emulsion-produced copolymer latex of styrene and acrylonitrile, having a K value of 52, a styrene/acrylonitrile ratio of 72:28 and a solids content of 30% by weight, relative to the aqueous emulsion. To achieve a rubber content of 23% in the finished copolymer, 2150 g. of the graft latex were combined with 6440 g. of the styrene/acrylonitrile latex, and 25 g. or 0.5%, relative to the solids content, of 2,6-di-tertiary butyl-4-methylphenol were added to the mixture as a stabiliser. The acrylonitrile/butadiene/styrene copolymer was precipitated from the resulting latex with 1% strength acetic acid at a temperature of 85° C., and was washed with water and dried.

(d) Dry mixing of the terpolymer obtained according to 1(c) with polyvinyl chloride: 74 parts of suspension polyvinyl chloride having a K value of 65 were mixed with 26 parts of the terpolymer manufactured according to 1(c) in a tumbler mixer, and 5 parts of stearyl alcohol as well as 2.5 parts of barium-cadmium laurate were introduced into the mixture. The resulting mixture was extruded, then granulated, and finally converted into a moulding composition by the injection moulding process, at 160° C. Relative to the amount of the elastomeric copolymer of butadiene and acrylonitrile in the moulding composition, which was 6% by weight, the degree of utilisation, defined as the quotient of the notched impact strength at 0° C. and the percentage content of the elastomer constituent in the moulding composition, was 0.95. The characteristic data of the moulding composition are summarised in Table 1.

EXAMPLES 2 TO 5

The procedure followed was analogous to Example 1, but dioctylphthalate, polyethylene glycol of molecular weight 1500, butyl stearate and a mineral oil with a melting point range of above 350° C. and a refractive index of $n_D^{20}=1.4816$ were respectively employed as the lubricant. The characteristic data of the moulding compositions obtained are summarised in Table 1.

EXAMPLES 6 TO 10

The procedure followed was analogous to Example 1, but a mineral oil with a melting point range of above 350° C. and a refractive index of $n_D^{20}=1.4816$ was in each case used as the lubricant, and dibutyl-tin bis-dodecylmercaptide, calcium stearate, lead stearate, basic lead phosphite and dibutyl-tin maleate were especially employed as the stabilisers. The characteristic data and features of the moulding compositions obtained are summarised in Table 1.

EXAMPLES 11 TO 14

The procedure followed was analogous to Example 1, but an amount of emulsifier of 3.2 g. or 0.1% by weight was used to manufacture the copolymer of butadiene and acrylonitrile according to 1(a). In these examples, the above-mentioned mineral oil was used as the lubricant and calcium stearate, lead stearate, basic lead phosphite and dibutyltin maleate were employed as stabilisers. The characteristic data and features of the moulding compositions obtained are summarised in Table 1.

EXAMPLES 15 AND 16

The procedure followed was analogous to Example 11, but using stearyl alcohol as the lubricant in each case, and barium-cadmium laurate or di-(n-butyl)-tin bis-dodecylmercaptide as the stabilisers. The characteristic data and features of the moulding compositions obtained are given in Table 1.

EXAMPLE 17

The procedure followed was analogous to Example 11, but using butyl stearate as the lubricant and di-(n-butyl)-tin bis-dodecylmercaptide as the stabiliser. The characteristic data and features of the moulding composition obtained are given in Table 1.

EXAMPLE 18

The procedure followed was analogous to Example 11, but using the abovementioned mineral oil as the lubricant and di(n-butyl)-tin bis-dodecylmercaptide as the stabiliser. The resulting moulding composition is characterised by containing 74% by weight of polyvinyl chloride and 26% by weight of terpolymer, and the terpolymer in turn contains 23% by weight of the elastomeric copolymer of butadiene and acrylonitrile. The characteristic data and features of the moulding composition obtained are given in Table 1.

EXAMPLES 19–22

The procedure followed was analogous to Example 11, but in the individual examples, firstly the ratios of polyvinyl chloride to the terpolymer and the proportions of the butadiene/acrylonitrile copolymer in the terpolymer were varied, and secondly di-(n-octyl)-tin S,S-bis-(isooctylmercaptoacetate) was used as the stabiliser. The compositions of the moulding composition produced, and its features, are given in Table 2.

TABLE 1

| Example | Stabiliser | Lubricant | ako | DUR | Colour | LFS | BIH | Gloss index | Vicat value (° C.) |
|---|---|---|---|---|---|---|---|---|---|
| 1 | A | I | 5.7 | 0.95 | Yellow | 630 | 1,100 | 65 | 79 |
| 2 | A | II | 4.5 | 0.75 | do | 700 | 1,220 | 55 | 82 |
| 3 | A | III | | | Not processable, scaly | | | | |
| 4 | A | IV | 6.5 | 1.06 | White | 600 | 970 | 75 | 81 |
| 5 | A | V | 6.3 | 1.05 | Yellow | 650 | 1,180 | 70 | 87 |
| 6 | B | V | 5.9 | 0.96 | do | 730 | 1,210 | 60 | 88 |
| 7 | C | V | | | Not processable, yellows | | | | |
| 8 | D | V | | | Not processable, yellows | | | | |
| 9 | E | V | | | Not processable, yellows | | | | |
| 10 | F | V | | | Not processable, yellows | | | | |
| 11 | C | V | | | Not processable, yellows | | | | |
| 12 | D | V | | | Not processable, yellows | | | | |
| 13 | E | V | | | Not processable, yellows | | | | |
| 14 | F | V | | | Not processable, yellows | | | | |
| 15 | A | I | 7.1 | 1.16 | Yellow | 670 | 1,140 | 75 | 79 |
| 16 | B | I | 8.4 | 1.40 | White | 790 | 1,180 | 75 | 79 |
| 17 | B | IV | 9.0 | 1.50 | do | 720 | 1,020 | 80 | 77 |
| 18 | B | V | 12.3 | 2.05 | do | 790 | 1,140 | 90 | 87 |

See notes at end of Table 2.

TABLE 2

| Example | Amount in percent by weight | | | ako | DUR | Colour | LFS | BIH | Gloss index | Vicat value (° C.) |
|---|---|---|---|---|---|---|---|---|---|---|
| | PVC | ABS | BAN | | | | | | | |
| 19 | 57 | 45 | 10 | 23.1 | 2.31 | White | 700 | 1,060 | 90 | 92 |
| 20 | 74 | 26 | 6 | 12.1 | 2.01 | ...do... | 800 | 1,160 | 90 | 87 |
| 21 | 82 | 18 | 4 | 8.0 | 2.00 | ...do... | 850 | 1,260 | 95 | 87 |
| 22 | 92 | 8 | 2 | 5.2 | 2.60 | ...do... | 850 | 1,180 | 100 | 87 |

Notes relating to Tables 1 and 2:
(a) Stabilisers:
A: barium/cadmium laurate;
B: butyl-tin bis-(dodecylmercaptide);
C: calcium stearate;
D: lead stearate;
E: basic lead phosphite;
F: dibutyl-tin maleate;
G: di-(n-octyl)-tin S,S-bis-(isooctylmercaptoacetate).
(b) Lubricants:
I = stearyl alcohol;
II = dioctyl phthalate;
III = polyethylene glycol;
IV = butyl stearate;
V = mineral oil.
(c) Abbreviations:
ako = notched impact strength (cm.kp./cm.$^2$), measured according to DIN 53,453;
DUR = degree of utilisation of rubber;
LFS = limiting flexural stress (kp./cm.$^2$), measured according to DIN 53,452;
BIH = ball indentation hardness (kp./cm.$^2$), measured according to DIN 57,302;
PVC = polyvinyl chloride;
ABS = acrylonitrile/butadiene/styrene terpolymer;
BAN = butadiene/acrylonitrile copolymer.

What is claimed is:

1. In the process for the manufacture of impact-resistant thermoplastic moulding compositions by intimately mixing polyvinyl chloride with a terpolymer in the presence of a stabilizer and a lubricant, and processing the resulting composition, with heating, to give a molding composition the impovement wherein 90 to 97% by weight of a mixture of 40 to 95% by weight of polyvinyl chloride having a K-value of about 60 to 70 and 5 to 60% by weight of a terpolymer of the components acrylonitrile-butadiene-styrene, are mixed with 1 to 4% by weight of a dialkyltin mercaptide stabilizer selected from the group consisting of di-(n-butyl)-tin bis-dodecylmercaptide and di-(octyl)-tin S,S-bis-isooctylmercaptoacetate) and 2 to 6% by weight of a mineral oil consisting of hydrocarbons with 20 to 30 carbon atoms as a lubricant; the terpolymer employed being obtained by polymerizing butadiene, in a first step, with about 1 to 30% by weight of acrylonitrile, in aqueous emulsion, in contact with 0.1 to 1% by weight of a catalyst and at most 0.2% by weight of an emulsifier, based on the amount of diene and acrylonitrile emloyed, at a temperature of between −20° C. and +100° C., to give an elastomeric copolymer; grafting the said copolymer, in a second step, with a mixture of styrene and acrylonitrile in an amount of at most about 30% by weight, based on the amount of the resulting graft polymer at a temperature of between 0° C. and 100° C., in aqueous emulsion, in contact with a catalyst; and blending the graft polymer, in a third step, with a copolymer of styrene and acrylonitrile having a K-value of between about 46 and 63 to form the final copolymer, wherein the third step blend comprised of elastomeric graft polymer and styrene/acrylonitrile copolymer contains 5 to 50% by weight of the elastomer constituent and 95 to 50% by weight of the copolymer.

2. The process as claimed in claim 1, wherein a mixture of 70 to 90% by weight of polyvinyl chloride and 10 to 30% by weight of the terpolymer is used.

3. The process as claimed in claim 1, wherein the blend is transformed into a moulding composition by subjecting it to milling, kneading, extrusion or injection moulding.

4. The process as claimed in claim 1, wherein the first step terpolymer is produced in contact with a catalyst comprised of inorganic or organic peroxide compounds or mixtures thereof, hydrogen peroxide, azo compounds or redox systems comprised of a peroxide compound and a low-valency metal compound or sulphur compound as the reducing agent.

5. The process as claimed in claim 1, wherein the first step terpolymer is produced in contact with an emulsifier comprised of alkali metal salts, of fatty acids with 8 to 20 carbon atoms, resin soaps, alkyl sulphates or alkyl sulphonates or alkylarylsulphonates with 8 to 20 carbon atoms in the alkyl radical.

6. The process as claimed in claim 1, wherein the first step elastomeric copolymer is grafted with a monomer mixture of styrene and acrylonitrile, the mixture containing at least 60% by weight of styrene.

References Cited
UNITED STATES PATENTS

| 2,802,809 | 8/1957 | Hayes | 260—876 |
| 3,438,971 | 4/1969 | Walker | 260—876 |
| 3,448,175 | 6/1969 | Doak et al. | 260—33.6 |
| 3,591,657 | 7/1971 | Fumio et al. | 260—876 |

FOREIGN PATENTS

| 699,357 | 12/1964 | Canada | 260—876 |

OTHER REFERENCES

Sarvetnick, Harold A., Polyvinyl Chloride, Von Nostrand Reinhold Co., New York, 1969, p. 98, ST 1180.148 SZC.Z.

MORRIS LIEBMAN, Primary Examiner

J. H. DERRINGTON, Assistant Examiner

U.S. Cl. X.R.

260—45.75 K, 876